United States Patent [19]

Patarin

[11] Patent Number: 5,867,577
[45] Date of Patent: Feb. 2, 1999

[54] METHOD AND APPARATUS FOR AUTHENTICATING A DATA CARRIER INTENDED TO ENABLE A TRANSACTION OR ACCESS TO A SERVICE OR A LOCATION, AND CORRESPONDING CARRIER

[75] Inventor: Jacques Patarin, Viroflay, France

[73] Assignee: Bull CP8, Paris, France

[21] Appl. No.: 402,063

[22] Filed: Mar. 9, 1995

[30] Foreign Application Priority Data

Mar. 9, 1994 [FR] France .................................. 94 02717

[51] Int. Cl.$^6$ ................................ H04L 9/00; H04L 9/30
[52] U.S. Cl. .............................. 380/23; 380/24; 380/25; 380/30; 380/49; 235/379; 235/380
[58] Field of Search .................... 380/4, 23, 24, 380/25, 30, 49, 50; 235/379, 380

[56] References Cited

U.S. PATENT DOCUMENTS

| 4,453,074 | 6/1984 | Weinstein | ................................. | 380/23 |
| 4,910,774 | 3/1990 | Barakat | ..................................... | 380/23 |

FOREIGN PATENT DOCUMENTS

| 1157992 | 6/1994 | Australia . |
| 02 998 26 | 1/1989 | European Pat. Off. . |
| 22 469 13 | 5/1975 | France . |
| 2078420 | 1/1982 | United Kingdom . |
| 85 02 927 | 7/1985 | WIPO . |
| 0252499 | 1/1988 | WIPO . |

*Primary Examiner*—Bernarr E. Gregory
*Attorney, Agent, or Firm*—Kerkam, Stowell, Kondracki & Clarke, P.C.; Edward J. Kondracki

[57] ABSTRACT

A method and an apparatus for authenticating a data carrier enables a transaction or access to a service or a location, and the corresponding carrier. The carrier (1) has a specific number (Ns) and an authentication value calculated from the specific number and from information (I) that defines the rights attaching to the carrier by means of an asymmetrical algorithm (F) and a secret key (Ks). Two types of authentication are provided. One is current, in a mode disconnected from the authorizing organization. The other is periodic, in a connected mode. In the disconnected mode, an algorithm (G) correlated with the asymmetrical algorithm (F) and using a public key (Kp) is applied to the authentication value (VA), read from the carrier, in order to verify that the authentication value (VA) is compatible with the specific number (Ns) and the information (I), and that the transaction or service requested is compatible with the information (I). In the connected mode, it is also possible to modify the authentication value of the carrier.

11 Claims, 1 Drawing Sheet

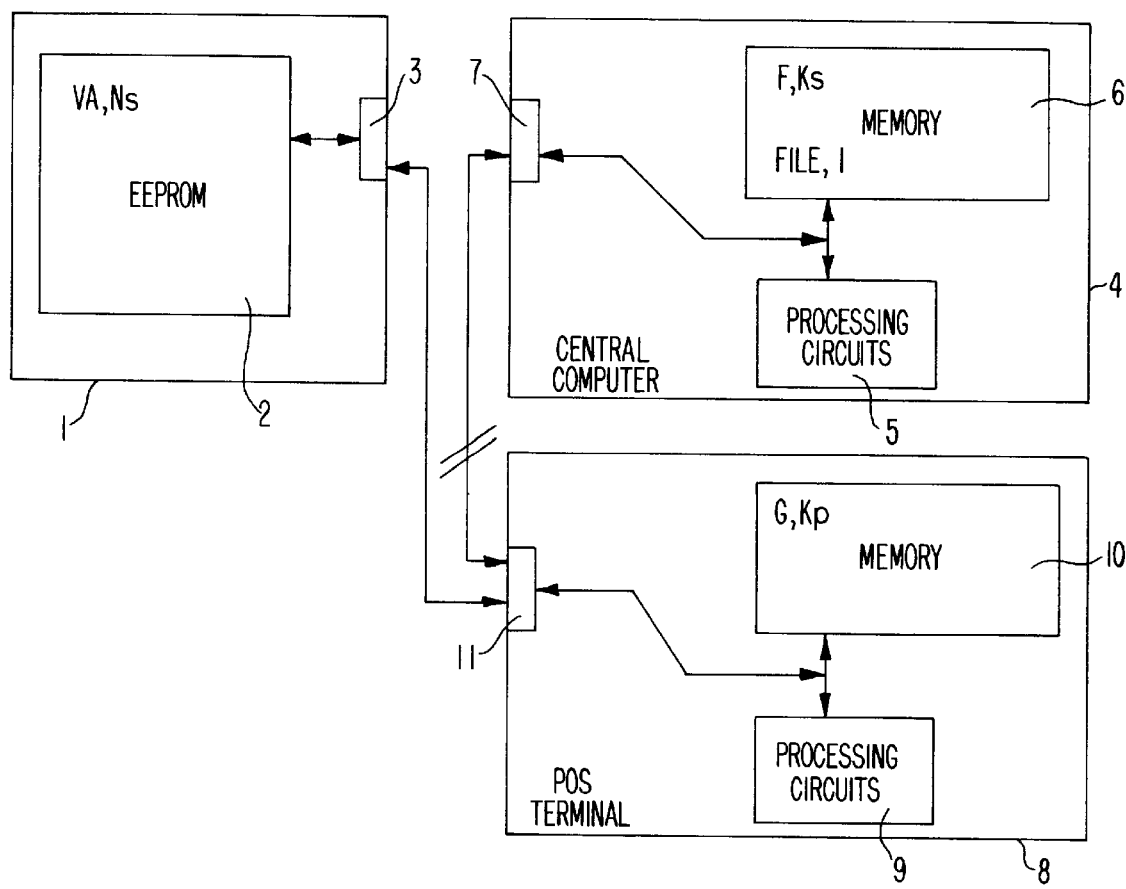

METHOD AND APPARATUS FOR AUTHENTICATING A DATA CARRIER INTENDED TO ENABLE A TRANSACTION OR ACCESS TO A SERVICE OR A LOCATION, AND CORRESPONDING CARRIER

FIELD OF THE INVENTION

The invention relates to a method for authenticating a data carrier or a device as genuinely issued by an authorized organization, where this carrier or device is intended to perform transactions or to enable access to a service or a location on the premises of an affiliated distributor of said organization, and where the organization keeps in a file the contents of the current rights attaching to each carrier, the method comprising assigning to each carrier a specific number (Ns) enabling it to be distinguished from among a set of carriers produced by said organization, and entering this number in the carrier. The invention also relates to the carrier and the apparatus associated with the carrier and method of authentication.

OBJECTS OF THE INVENTION

The object of the invention is to propose a method of this type which employs the simplest possible means in the carrier itself and in an optional terminal of the distributor that is intended to cooperate with the carrier. In the case where the carrier is electronic for example, it is desirable for it to be made up solely of a memory, without any associated calculation circuits, and for each memory to have the smallest possible size. It is also desirable for neither the carrier nor the associated terminal to contain a secret key, because such a key is vulnerable to being discovered by someone with an intent to commit fraud.

According to the invention, these objects are attained by a method of the generic type referred to at the outset above, and further comprising: initializing said carrier or device at the organization by assigning to it information (I) that as a function of the contents of said file defines the rights attaching to this carrier, by calculating, from the specific number (Ns) and the information (I), an authentication value (VA) by means of an asymmetrical algorithm (F) and a secret key (Ks), and entering said authentication values in the carrier; upon each use of the carrier, performing an authentication thereof by said distribution in a mode not connected to the authorized entity, by performing a calculation, by application of an algorithm (G) correlated with said asymmetrical algorithm (F), of a public key (Kp) associated with said secret key (Ks) and the authentication value (VA) read from the carrier, to verify on the one hand that the authentication value (Va) is compatible with the specific number (Nf) and the information (I), and on the other that the transaction or service requested is compatible with the information (I); periodically or as a function of the type of transaction or service, performing an authentication of the carrier from the distributor in a mode connected to the authorized organization, by performing first an authentication of the carrier by the distributor or the authorized organization, which verifies that the authentication value (VA) read from the carrier is compatible with the specific number (Ns) and the information (I), and if the authentication is positive, making confirmation by the authorized organization that the carrier still possesses the rights as a function of the current status of said file, and then if the answer is affirmative and if a change of the information (I) is necessary in order to translate the current state of the rights, calculating from the specific number (Ns) and from a new information (I) a new authentication value (VA'), by means of the asymmetrical algorithm (F) and the secret key (Ks), and entering this new value in the carrier. Because an asymmetrical algorithm is used, only the operations writing the authentication value (VA) require the use of a secret key, while the typical verification of this value requires only a public key.

However, the fact that a periodic connection with the authorizing organization is contemplated enables the performance of a more than complete verification of the rights attaching to each carrier, and of updating the carrier if necessary.

BRIEF DESCRIPTION OF THE DRAWING

Further details and advantages of the invention will become more apparent from the ensuing detailed description of a preferred but not limiting embodiment, in conjunction with the single accompanying drawing FIGURE, which schematically shows a portable object that cooperates with a terminal of an authorizing organization and a terminal installed at a point of sale.

DESCRIPTION OF THE PREFERRED EMBODIMENTS

In the drawing, a portable object 1 is shown, which may be, in particular an electronic card, equipped with a EEPROM memory 2 externally connected via an interface 3. The card does not contain any processing circuits of the microprocessor type. Located in the memory 2 in particular are two pieces of information, specifically a serial number Ns assigned to the card when it is manufactured, and an authentication value VA intended to prove that the card was indeed issued by an authorized organization. The calculation of the value VA will be explained hereinafter.

Reference numeral 4 indicates a central computer of the organization that is authorized to issue or update the card 1. In particular, the computer includes processing circuits 5 and a memory 6 that communicate with one another and with an interface 7. Implanted in the memory 6 is the program of a cryptographic asymmetrical algorithm F, which in a manner known per se requires the use of a secret key Ks, also in memory, for enciphering a datum, while deciphering the datum requires the use of only a corresponding public key Kp. Also located in the memory 6 is a file that contains the current rights attaching to each of the carriers issued by the authorized organization.

The goal is to calculate an authentication value VA for introduction into the card 1, by using two items of data, specifically the serial number Ns of the card and an item of information I that defines the rights attaching to this card. The information I is worked out as a function of the contents of the file and may take one of the following forms, for example:

1. A reference date enabling the calculation of a limit date for the rights: this involves in particular the date on which the holder of the card subscribed to a given service for a given duration, or directly the limit date for access to this service;
2. The following message: "Do not accept any transaction in an amount greater than 100 F"; where "F" is a unit of money
3. The message: "As of the present date, the rights of Mr. X are valid";
4. A numeral, between 1 and 10, that defines the degree of confidence the organization has in the owner of the card.

Preferably, the information I, which is not secret, is nevertheless expressed in an enciphered form, to preserve a certain confidentiality.

It may thus be written as follows:

$$VA = F(Ns, I, Ks)$$

It will be noted that VA may be considered to be an asymmetrical signature of a message constituted by the serial number Ns and the information I.

In a variant, the number Ns could be constituted by any other number capable of individually identifying the card 1.

A point of sale terminal 8 is shown for the distribution of goods or services, or for payment for them. It includes processing circuits 9 and a memory 10 that cooperate with one another and with an interface 11 by appropriate links. The memory contains the program of an algorithm G associated with the aforementioned algorithm F and also contains the public key Kp associated with the secret key Ks.

In a first embodiment, a procedure of the "with message recovery" type is employed (that is, one enabling the contents of the message to be recovered). In that case, the algorithm F is based on the problem of factoring, and the algorithm G contained in the terminal is constituted by the algorithm $F^{(-1)}$ that is the inverse of the algorithm F. To assure the security-oriented nature of the calculation of VA, the size of VA in the memory 2 of the card 1 should preferably be equal to at least 512 bits.

The terminal is accordingly capable of retrieving the pair of values Ns, I, as follows:

$$(Ns, I) = F^{-1}(VA, Kp)$$

As the algorithm F, an algorithm of the RFA type (Rivest, Shamir, Adleman) may be used in particular, for example in the following form:

$$VA = [\tfrac{1}{3}(Ns, I)] \text{ modulo } n$$

where:

-(Ns, I) stands for the concatenation of Ns and I;

-n represents the public key Kp; n=p×q, where p and q are two first secret numbers making up the secret key Ks. In this case, $F^{-1}$ is expressed as follows:

$$(Ns, I) = VA^3 \text{ modulo } n$$

The method of authenticating the card includes, first, a phase of initialization at the authorized organization, where its central computer 4 calculates a first value VA for a given card and enters it into the memory 2 of the card.

In use, the terminal 8 at each point of sale affiliated with the authorized organization can proceed in a disconnected mode relative to the central computer 4 of the organization to perform a certain number of successive verifications of the same card 1, corresponding to that many transactions required. Upon each verification, it recalculates the pair Ns, T from the algorithm $F^{-1}$ applied to the value VA that it reads in the memory of the card. It can then verify on the one hand that the serial number Ns that it reads from the memory of the card indeed corresponds to the number calculated, and on the other that the information I calculated is coherent information per se, or in other words constitutes a comprehensible message that is compatible with the transaction requested. If the result of this is affirmative, the point of sale terminal can authorize the transaction.

Referring to the numbered examples of information I given above, the verification of the compatability can for example comprise assuring the following:

1. That the limit date of the rights has not expired, on the date of the transaction;
2. That the amount of the transaction is not more than 100 F;
3. That the rights of Mr. X do not require reconfirmation on the part of the authorized organization, based on how long ago the last confirmation was made;
4. That the nature of the transaction is authorized, based on the assigned number.

On the other hand, a difference between Ns as read and Ns as calculated, or incoherence of the information I calculated, would indicate that the card was not issued by the authorized organization, and so the point of sale terminal would refuse the transaction.

Once a month, for example, or when major transactions are made, the point of sale terminal performs a verification in the "connected" mode, that is, connected to the central computer 4 of the authorized organization. In a first phase, this involves assuring the card is indeed authentic. This can be done in two ways. Either the point of sale terminal verifies the value VA in the "disconnected" mode as explained above, or the authorized organization is tasked with this. This organization has all the elements that allowed it to assign an authentication value VA to the card, and so it is easy for this organization to verify the value VA read from the card, for example either by direct comparison with the contents of the file in which the authentic value VA, the serial number Ns and the information I had been placed, or by comparison with a value VA recalculated for the specific situation in the manner described above.

In a second phase, in which the function in all cases is in the "connected" mode, the central computer of the organization verifies, by consulting the file, that the card carrying the recalculated number Ns still possesses the rights. For example, it verifies:

-that no complaint has been filed that the card had been stolen;

-that the bank account to which the card has rights is not overdrawn; and so forth.

In a third phase, and as needed, the organization "refreshes" the authentication value VA in order to lengthen the term of validity, either as a function of existing rights of the card or as a function of new rights subscribed to since the previous connection. To do so, the central computer of the organization calculates a new value VA' as a function of a new piece of information I', taking this modification of the rights into account as follows:

$$VA' = F(Ns, I', Ks)$$

Then, it writes this value VA' into the memory 2 of the card, in place of the current value VA, which terminates the procedure.

In a second embodiment of the invention, a procedure of the "without message recovery" type (that is, not enabling recovery of the contents of the message) is employed. In this case, the algorithm F is for example based on the problem of the discrete logarithm, and the algorithm G contained in the terminal is not constituted by the algorithm $F^{-1}$ that is the inverse of F but rather is correlated solely with the latter in such a way as to enable verification that the authentication value VA has indeed been calculated from the serial number Ns and the information I. By way of example, the algorithm G is the known DSS algorithm (for Digital Signal Standard), which makes it possible on the basis of not only the authentication value VA and the public key Kp, but also the serial number Ns and the information I, to verify the compatability between VA on the one hand and Ns, I on the other. Here, recalculation of Ns and I by the terminal is not possible. On the other hand, to assure the security-oriented nature of VA, it suffices for if its size in the memory 2 of the card 1 to be preferably at least equal to 320 bits.

Calculating compatability by the terminal requires, in this second embodiment, that the terminal have knowledge of the serial number Ns and the information I. With respect to the serial number, it will be read by the terminal from the card 1. As for the information I, two situations may be contemplated:
- either this information is stored in the memory 2 of the card, and the terminal will read it there;
- or this information is known implicitly by the terminal, since it is unique for one entire given category of customers; it may for instance be information in the following form: "transactions allowed up to 1000 F".

In use, the terminal 8 at each point of sale can proceed in the disconnected mode to perform the successive verifications of the same card 1. Each time, it verifies the compatability of the value VA with the values Ns, I, by using the algorithm G, these three values being read from the card or—with respect to the information I—being known implicitly by the terminal. If the answer is affirmative, then it can authorize the transaction. As in the first embodiment, the terminal can verify the compatability of the information I with the transaction requested.

The function in the connected mode is similar to that described for the first embodiment, the only difference being if the first aforementioned phase, in which the authenticity of the card is verified, is done by the point of sale terminal, then the values Ns and I in question are the values read from the card, not the recalculated values. If the rights attaching to the card must be modified, then the central computer of the authorized organization writes a new authentication value VA', and as applicable new information I', in place of the current data.

The present invention applies not only to the authentication of a memory card but more generally of any data carrier, whether electronic or not, for example of the paper type (identity card or authorization card on which the serial number Ns and the authentication VA are written).

The data carrier may even be embodied by a device such as a portable computer that incorporates the serial number Ns and the authentication value VA.

I claim:

1. A method for authenticating a data carrier held by a user as being genuinely issued by an authorized organization, before allowing said user to perform transactions or to have access to a service or a location on the premises of an affiliated distributor of said organization, the organization having a file defining current rights attaching to said carrier, the method comprising:
   assigning to said carrier a specific number (Ns) enabling said carrier to be distinguished from among a set of carriers produced by said organization,
   entering said specific number in the carrier,
   initializing said carrier at the organization by assigning to said carrier information (I) that is a function of the contents of said file and defines current rights attaching to said carrier, and by calculating, from said specific number (Ns) and said information (I), a current authentication value (VA) using an asymmetrical algorithm (F) and a secret key (Ks), and entering said current authentication value in said carrier;
   upon each use of said carrier, performing an authentication thereof by said affiliated distributor in a mode not coupled to the authorized organization, by performing a calculation, by applying an algorithm (G) correlated with said asymmetrical algorithm (F) to a public key (Kp) associated with said secret key (Ks) and to the current authentication value (VA) read from the carrier, to verify that the authentication value (VA) corresponds to the specific number (Ns) and the information (I) assigned to said carrier, and that the transaction or service requested is compatible with the information (I);
   based on a predetermined condition defining when an authentication of the data carrier must be made in a mode in which the terminal is coupled to the authorized organization, selectively performing an authentication of the data carrier in said mode coupled to the authorized organization by performing first an authentication of the carrier by the distributor or the authorized organization, which verifies that the current authentication value (VA) read from the carrier corresponds to the specific number (Ns) and the information (I) assigned to said carrier, and if the authentication is positive, making confirmation by the authorized organization that the carrier still possesses the rights as a function of the current status of said file, and then if the confirmation is affirmative and if a change of the information (I) is necessary in order to translate the current state of the rights, calculating from the specific number (Ns) and from an updated information (I) an updated authentication value (VA'), by means of the asymmetrical algorithm (F) and the secret key (Ks), and entering this updated value in the carrier.

2. The method of claim 1, in which the algorithm (G) correlated with the asymmetrical algorithm (F) includes an algorithm ($F^{-1}$) that is the inverse of the asymmetrical algorithm, and each time the carrier is used, said authentication is performed by calculating, with said algorithm ($F^{-1}$), the specific number (Ns) and the information (I) that relate to the carrier, using the current authentication value (VA) read from said carrier, and then verifying that the specific number (Ns) read is identical to that calculated and that the information (I) calculated constitutes a comprehensible message and is compatible with the transaction or service requested.

3. The method of claim 1, in which said algorithm (G) correlated with the asymmetrical algorithm (F) is such that said authentication requires the knowledge of the information (I) and the specific number (Ns), the information (I) either being entered in the carrier or known by the distributor, and each time the carrier is used, said calculation is performed by further applying to the correlated algorithm (G) the specific number (Ns) read from the carrier and the information (I).

4. The method of claim 1, in which said information (I) includes a reference date enabling the calculation of an expiration date of the rights attaching to the carrier, and upon each authentication, verifying whether on the date of the transaction or service requested, the expiration date of the rights has expired.

5. The method of claim 1, in which said predetermined condition defines that an authentication of the data carrier in a mode in which the terminal is coupled to the authorized organization must be made periodically.

6. The method of claim 1, in which said predetermined condition defines that an authentication of the data carrier in a mode in which the terminal is coupled to the authorized organization must be made as a function of a type of transaction or service.

7. A terminal for cooperating with a data carrier for providing a transaction or a service, said data carrier storing a specific number ($N_s$) enabling said data carrier to be distinguished from among a set of carriers produced by an authorized organization and a current authentication value (VA) calculated by an asymmetrical algorithm (F) from a secret key (Ks), said specific number ($N_s$), and an information (I) which is a function of contents of a file being in possession of said authorized organization and defining current rights attached to said data carrier, said terminal comprising:

- means for memorizing an algorithm (G) correlated with said asymmetrical algorithm (F), a public key (Kp) associated with the secret key (Ks), and a predetermined condition defining when an authentication of the data carrier must be made in a mode in which the terminal is coupled to the authorized organization;
- means for performing a calculation using the algorithm (G), the public (Kp), and the current authentication value (VA) read from the data carrier, to verify that the current authentication value (VA) corresponds to the specific number ($N_s$) and the information (I), and that the transaction or service requested is compatible with the information (I);
- means for deciding, in view of said predetermined condition, whether authentication of the data carrier must be made in a mode in which the terminal is coupled to the authorized organization or not; and
- means for requesting to the authorized organization to check the current authentication value (VA) if the authentication must be made in said mode.

8. The terminal of claim 7, in which said predetermined condition defines that an authentication of the data carrier in said mode in which the terminal is coupled to the authorized organization must be made periodically.

9. The terminal of claim 7, in which said predetermined condition defines that an authentication of the data carrier in said mode in which the terminal is coupled to the authorized organization must be made as a function of a type of transaction or service.

10. A central computing apparatus of an authorized organization for cooperating with a data carrier having means for storing a specific number ($N_s$) enabling said data carrier to be distinguished from among a set of carriers produced by said authorized organization and an a current authentication value (VA) calculated by an asymmetrical algorithm (F) from a secret key (Ks), said specific number ($N_s$), and an information (I) which is a function of contents of a file being in possession of said authorized organization and defining current rights attached to said data carrier, said central computing apparatus comprising:

- means for memorizing said file, said asymmetrical algorithm (F), and said secret key (Ks);
- means for checking whether the data carrier still possesses rights and whether said current authentication value (VA) on the data carrier must be updated or not, as a function of a current state of said file;
- means for calculating, from an updated information (I') read in said file and the specific number ($N_s$), an updated authentication value (VA') using the asymmetrical algorithm (F) and the secret key (Ks); and
- means for entering said updated authentication value (VA') into said data carrier.

11. The central computing apparatus of claim 10, which cooperates with said data carrier via a terminal, said terminal being coupled at a distance with said central computing apparatus, and said data carrier being coupled locally with said terminal.

\* \* \* \* \*